Figure 1:
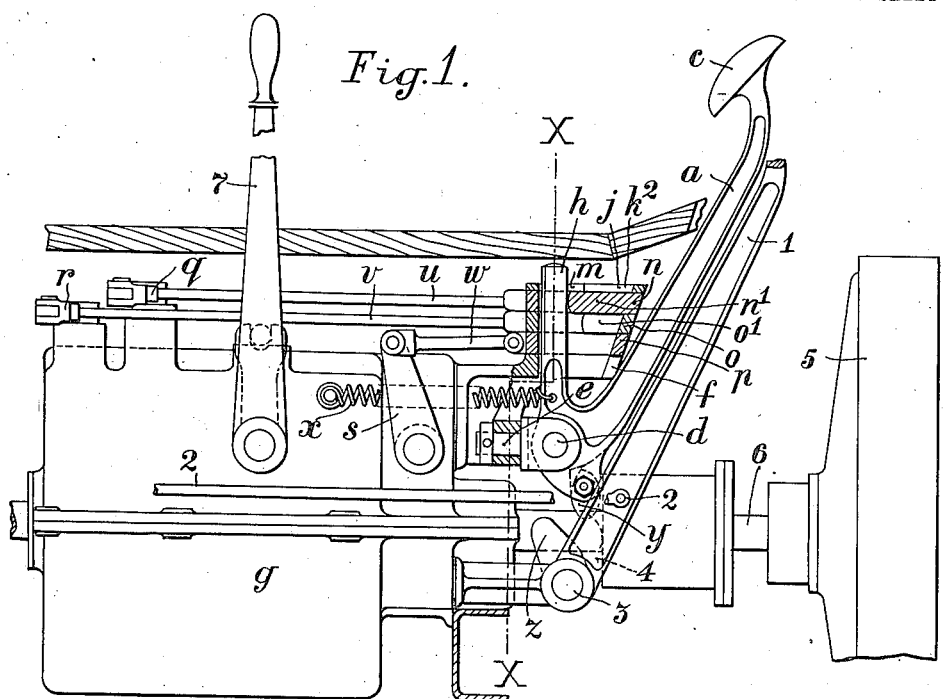

A. H. ADAMS & M. C. I. HUNTER.
SPEED CHANGING MECHANISM FOR MOTOR CARS.
APPLICATION FILED JULY 15, 1910.

1,006,893.

Patented Oct. 24, 1911.

3 SHEETS—SHEET 1.

Witnesses
Inventors
Arthur H. Adams
Marquis C. I. Hunter
By James L. Norris, Atty.

A. H. ADAMS & M. C. I. HUNTER.
SPEED CHANGING MECHANISM FOR MOTOR CARS.
APPLICATION FILED JULY 15, 1910.

1,006,893.

Patented Oct. 24, 1911.

3 SHEETS—SHEET 2.

Witnesses:

Inventors
Arthur H. Adams
Marcus C. I. Hunter

A. H. ADAMS & M. C. I. HUNTER.
SPEED CHANGING MECHANISM FOR MOTOR CARS.
APPLICATION FILED JULY 15, 1910.
1,006,893.
Patented Oct. 24, 1911.
3 SHEETS—SHEET 3.
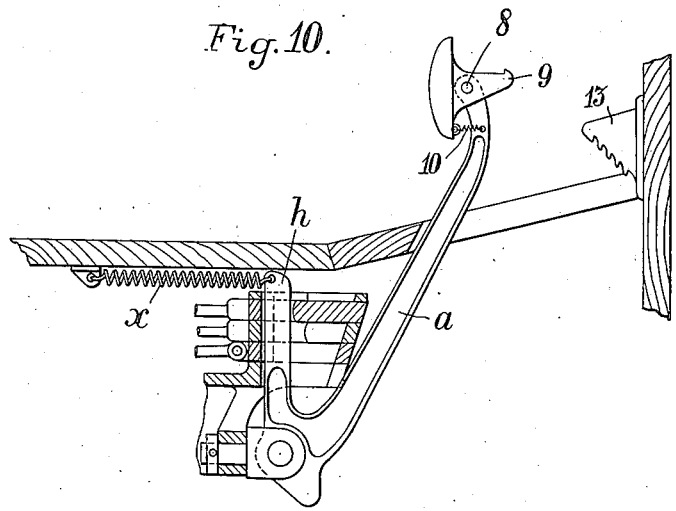
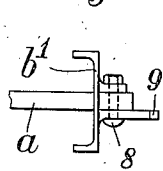
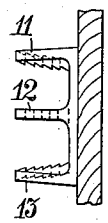

ary of.Letters Patent.

UNITED STATES PATENT OFFICE.

ARTHUR HENRY ADAMS, OF LONDON, AND MARCUS CHARLES INMAN HUNTER, OF BEDFORD, ENGLAND, ASSIGNORS TO ADAMS MANUFACTURING COMPANY, LIMITED, OF LONDON, ENGLAND, A CORPORATION OF GREAT BRITAIN.

SPEED-CHANGING MECHANISM FOR MOTOR-CARS.

1,006,893.

Specification of Letters Patent.

Patented Oct. 24, 1911.

Application filed July 15, 1910. Serial No. 572,180.

*To all whom it may concern:*

Be it known that we, ARTHUR HENRY ADAMS, a citizen of the United States of America, residing at London, England, and MARCUS CHARLES INMAN HUNTER, a subject of the King of Great Britain, residing at Bedford, England, have invented new and useful Improvements Relating to Speed-Changing Mechanism for Motor-Cars and the Like, of which the following is a specification.

This invention relates to speed-changing mechanism for motor-cars, road locomotives and like vehicles and comprises improved means for actuating change-speed gears of any suitable type (*e. g.* sliding gear-wheel, planetary, epicyclic) by means of pedals.

The improved mechanism is of the kind wherein a series of longitudinally-movable members, which are respectively connected to the several speeds of a change-speed-gear, are actuated alternatively by means of a lever, which can be oscillated about two axes that are perpendicular to each other and which has its alternative longitudinal paths defined by the slots of a gate-plate.

According to the present invention, the said longitudinally-movable members are made in the form of superposed plates having apertures through which the transversely and longitudinally-movable lever permanently extends, the rear walls of said apertures registering with the rear wall of the transverse slot of the gate-plate when the several speeds of the change-speed gear are in their inoperative positions, so as to insure that all the speeds of the change-speed-gear shall be brought into such inoperative position when the transversely and longitudinally-movable lever is returned to said transverse slot. This return of the transversely and longitudinally-movable lever to said transverse slot is effected by means of a cam on an independent lever which simultaneously serves for throwing out of engagement the driving clutch of the motor and applying the brake. The said invention moreover comprises means for automatically bringing the transversely and longitudinally-movable lever opposite one of the notches or slots of the gate-plate.

Figure 2:
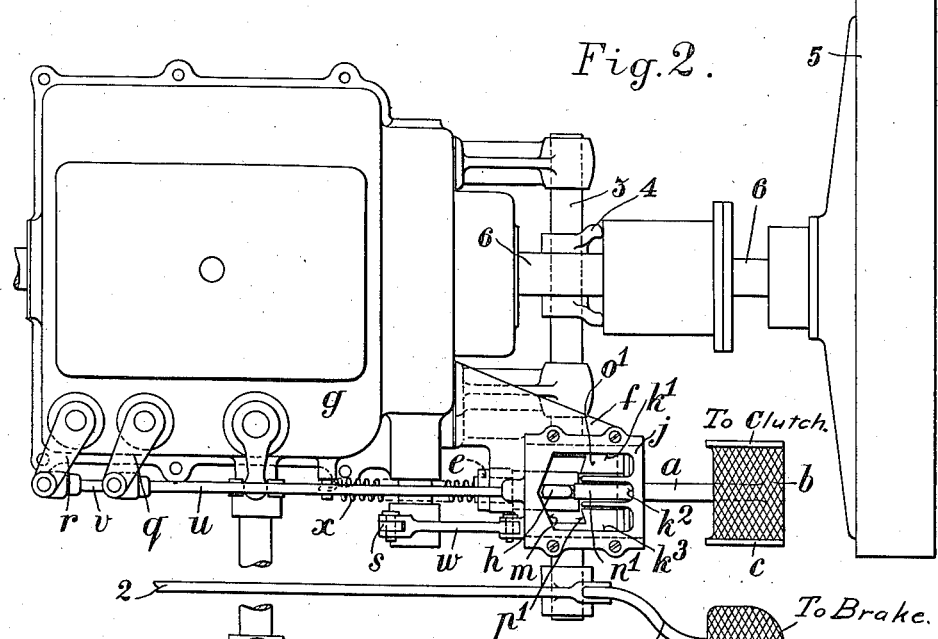
Figure 3:
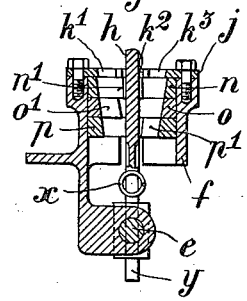
Figure 4:
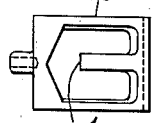
Figure 5:
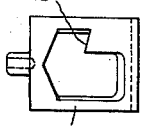
Figure 6:
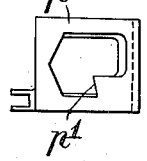
Figure 7:
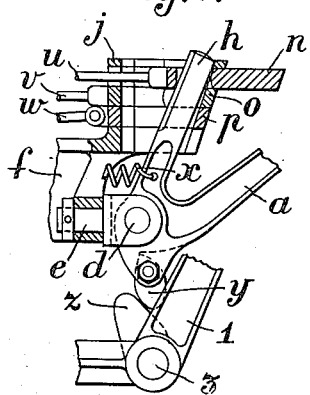
Figure 8:
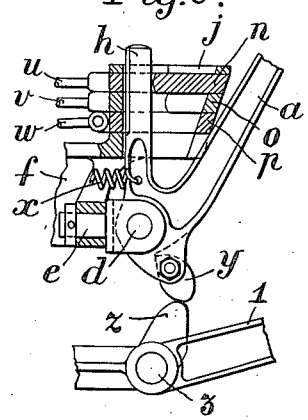
Figure 9:
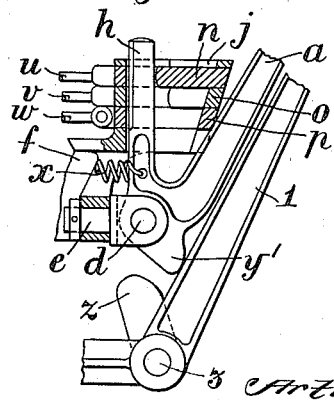

In the accompanying drawings: Figure 1 is a side elevation, partly in vertical section, and Fig. 2 a plan, showing one form of the improved mechanism in its off or neutral position. Fig. 3 is a vertical section on the line X—X, Fig. 1. Figs. 4, 5 and 6 are plan views showing details of construction. Figs. 7 and 8 are vertical sections illustrating the operation of returning the speed-pedal to its off or neutral position. Fig. 9 is a vertical section corresponding to Fig. 1 and showing a modified form of construction. Fig. 10 is a view similar to Fig. 1 showing a further modified form of construction. Figs. 11 and 12 are plan views of the modified form of construction shown in Fig. 10, showing details of construction.

Referring to these drawings, $a$ is a pedal termed the speed-pedal, which is provided at its free end with a foot- or toe-plate $b$ having upwardly-extending flanges $c$, $c$ for engaging the sides of the driver's foot. This pedal is pivoted at $d$ to one end of a short shaft $e$ which is rotatably mounted in a casting or frame $f$ fixed for example to the change-speed-gear box $g$.

The pedal $a$ has mounted thereon an arm or lever $h$ which extends into the frame $f$ and engages at its free end with a gate-plate $j$ forming a top to the frame $f$. This plate has a series of slots $k'$, $k^2$, $k^3$ extending longitudinally of the vehicle and opening at their rear ends into a transverse slot $m$, the rear wall of which is formed with inclined surfaces converging toward the center of the slot. In the frame $f$, beneath the gate-plate $j$, are arranged sliding plates $n$, $o$, $p$, each of which is formed with an internal aperture to clear the lever $h$ and with a projection ($n'$, $o'$, $p'$ respectively) extending into said aperture and corresponding in position to one of the longitudinal slots of the gate-plate. The apertures in the said plates have their rear walls registering with the rear wall of the transverse slot $m$ in the gate-plate and have their internal projections extending toward said rear wall but at a distance therefrom slightly greater than the width of the lever $h$, so as to enable said lever to pass freely between said wall and projection and to move the plate in either direction with a minimum amount of lost motion. Each of these plates is connected to a lever ($q$, $r$, $s$ respectively) controlling one of the speeds of the change-speed gear. The two upper plates $n$, $o$ have rods $u$, $v$ coupled directly to their levers $q$, $r$ while the lowermost plate is connected to the corresponding lever $s$ by a link $w$.

The pedal $a$ is connected by a spiral spring $x$ to the box $g$, so as to draw the lever $h$ toward the inclines on the rear wall of the slot $m$ and, by causing it to slide along one or other of said inclines, return it to the mid-position. The spring $x$ is made of sufficient strength to move the lever $h$ along the transverse slot $m$ to its mid-position as above described, but is sufficiently weak to allow the said lever to be retained in its forward position by the friction of the sliding plates and connected parts when moved into such forward position by the pedal $a$. The pedal $a$ is further provided with a projection $y$ which is adapted to engage with a cam-lever $z$ on a second pedal 1, in order to return the lever $h$ to the slot $m$ from any of the slots $k'$, $k^2$, $k^3$, as shown in Figs. 7 and 8 with reference to the slot $k^2$ and sliding plate $n$. The projection $y$ is pivotally mounted on the speed-pedal $a$, so as to yield when the pedal 1 is moved backward, in order to prevent any possibility of the speed-pedal $a$ being locked in either of its extreme positions by the cam-lever $z$. If desired the pivoted projection $y$ can be replaced by a rigid projection e. g. formed integrally with the lever $h$ or pedal $a$, as shown at $y'$ in Fig. 9. The pedal 1 may also be connected to the brake-mechanism of the car by means of a link 2, and through a shaft 3 and lever 4 to the clutch 5 in the shaft 6 between the engine and the change-speed-gear. The connection with the brake-mechanism is preferably made in such a manner that the brake shall only come into action toward the end of the forward travel of this pedal 1. The reversing gear is preferably actuated by means of an independent lever 7.

The operation of the improved gear is as follows:—Assuming it to be desired to throw into operation the speed to be controlled by the lever $r$, the pedal $a$ is swung to the left whereby the lever $h$ is also moved toward the left hand end of the transverse slot $m$. The lever $h$ is then pushed forward into the longitudinal slot $k'$ so as to come into engagement with the projection $o'$ on the sliding plate $o$ and so move the said plate together with its rod $v$ forward and so turn the lever $r$ sufficiently to throw into gear the speed controlled thereby. If it be desired to throw into gear the speed controlled by the lever $q$, the pedal 1 is pressed down so as to cause the cam lever $z$ to press against the projection $y$ on the pedal $a$ and return this pedal to its original position, Fig. 1, thereby returning the plate $o$ and lever $r$ to their original positions and causing the lever $h$ to come into contact with the rear wall of the transverse slot $m$. The spring $x$ then causes it to slide along the left hand incline to the central position. The pedal $a$ is then pushed forward without being deflected either to the right or to the left, so as to cause the lever $h$ to enter the center longitudinal slot $k^2$ of the gate-plate. In so doing it engages with the projection $n'$ on the plate $n$ and moves this plate forward together with the lever $q$, thus throwing into operation the corresponding speed of the change-speed-gear. The return of the lever $h$ and plate $o$ is effected as shown in Figs. 7 and 8.

In the arrangement shown in Figs. 10, 11 and 12, instead of returning the speed pedal $a$ and lever $h$ to their original positions by means of a pedal 1, the spring $x$ is made of sufficient strength to return the pedal $a$ and lever $h$ to their original positions. In order to avoid the necessity of holding the speed-pedal forward continuously by the foot, the toe-plate $b'$ is made separately from the pedal $a$ and is pivotally connected thereto at 8. This pivoted toe-plate $b'$ is provided with a toothed extension or catch 9 which, when the speed-pedal is pushed forward, is drawn by a spring 10 into engagement with the teeth of one or the other of a series of racks 11, 12, 13 corresponding to the several longitudinal slots $k'$, $k^2$, $k^3$ of the gate plate, according to which of the said slots the lever $h$ is brought into engagement with. By this means, the speed-pedal $a$ can be held in its forward position as long as desired without attention from the driver. In order to release the speed-pedal, it is only necessary to press forward the upper edge of the toe-plate $b'$, so as to move the tooth or catch 9 out of engagement with the rack 11, 12 or 13, whereupon the speed-pedal and lever $h$ can be returned to their original positions by the spring $x$.

What we claim is:—

1. The combination, with the operating members of a change-speed-gear, of a gate-plate having one transverse slot and a plurality of longitudinal slots connected with said transverse slot, a plurality of superposed sliding plates movable parallel to said gate-plate and having apertures whose rear walls in the rearmost position of the plates register with the rear wall of the transverse slot of said gate-plate, means for guiding said sliding plates, a lever pivotally mounted to move in the slots of said gate-plate and extending permanently through the apertures of said sliding plates, projections in the apertures of said sliding plates corresponding respectively in position with the longitudinal slots of said gate-plate, and means for connecting said sliding plates with the operating members of the change-speed-gear respectively.

2. The combination, with the operating members of a change-speed-gear, of a gate-plate having a transverse slot formed with an inclined rear wall and a plurality of longitudinal slots connected with said transverse slot, a plurality of superposed sliding plates movable parallel to said gate-plate and having apertures whose inclined rear walls in the rearmost position of the plates register with the inclined rear wall of the transverse slot of said gate-plate, means for guiding said sliding plates, a lever pivotally mounted to move in the slots of said gate-plate and extending permanently through the apertures of said sliding plates, projections in the apertures of said sliding plates corresponding respectively in position with the longitudinal slots of said gate-plate, means for connecting said sliding plates with the operating members of the change-speed-gear, and elastic means for drawing said lever toward said inclined rear wall of the transverse slot of the gate-plate.

3. The combination, with the operating members of a change-speed-gear, of a gate-plate having a transverse slot formed with an inclined rear wall and a plurality of longitudinal slots connected with said transverse slot, a plurality of superposed sliding plates movable parallel to said gate-plate and having apertures whose inclined rear walls in the rearmost position of the plates register with the inclined rear wall of the transverse slot of said gate-plate, means for guiding said sliding plates, a lever pivotally mounted to move in the slots of said gate-plate and extending permanently through the apertures of said sliding plates, projections in the apertures of said sliding plates corresponding respectively in position with the longitudinal slots of said gate-plate, means for connecting said sliding plates with the operating members of the change-speed-gear, elastic means for drawing said lever toward said inclined rear wall of the transverse slot of the gate-plate, a pedal connected to said lever, a projection on said lever, an independently-pivoted cam-lever adapted to engage said projection, and a pedal connected to said cam-lever.

4. The combination, with the operating members of a change-speed-gear, of a gate-plate having one transverse slot, a plurality of longitudinal slots connected with said transverse slot, and an inclined rear wall to said transverse slot, a lever pivotally mounted to move in said slots, a spring acting to draw said lever against said inclined wall, a series of sliding plates guided to move parallel to said gate-plate and provided with apertures through which said lever permanently extends, projections on said sliding plates adapted to register with the longitudinal slots of said gate-plate respectively and means for connecting said sliding plates with said operating members of the change-speed-gear respectively.

5. The combination, with the operating members of a change-speed-gear, of a gate-plate having one transverse slot and a plurality of longitudinal slots connected with said transverse slot, a plurality of superposed sliding plates movable parallel to said gate-plate and having apertures whose rear walls in the rearmost position of the plates register with the rear wall of the transverse slot of said gate-plate, means for guiding said sliding plates, a lever pivotally mounted to move in the slots of said gate-plate and extending permanently through the apertures of said sliding plates, projections in the apertures of said sliding-plates corresponding respectively in position with the longitudinal slots of said gate-plate, means for connecting said sliding plates with the operating members of the change-speed-gear respectively, a pedal connected to said lever, a projection on said lever, an independently pivoted cam-lever adapted to engage said projection, a pedal connected to said cam-lever, a clutch, a brake-rod, and coupling devices between said cam-lever, the movable member of said clutch and said brake-rod.

6. The combination, with the operating members of a change-speed-gear, of a gate-plate having a transverse slot and a plurality of longitudinal slots connected with said transverse slot, a lever mounted to move in the slots of said gate-plate, a series of sliding plates guided to move parallel to said gate-plate, projections on said sliding plates adapted to register with the longitudinal slots of said gate-plate respectively, means for connecting said sliding plates with the said operating members of the change-speed-gear respectively, a projection on said lever, an independently pivoted cam-lever adapted to engage with said projection and a pedal connected to said cam-lever.

7. The combination, with the operating members of a change-speed-gear, of a gate-plate having a transverse slot and a plurality of longitudinal slots connected with said transverse slot, a selector-lever mounted to move in the slots of said gate-plate, a series of sliding plates guided to move parallel to said gate-plate, projections on said sliding plates adapted to register with the longitudinal slots of said gate-plate respectively, means for connecting said sliding plates with said operating members of the change speed-gear respectively, an independently-pivoted cam-lever, a pedal connected to said cam-lever, and means on said selector lever for engaging said cam-lever.

8. The combination, with the operating members of a change-speed-gear, of a gate-plate having a transverse slot and a plurality of longitudinal slots connected with said transverse slot, a plurality of superposed plates movable parallel to said gate-plate and having apertures whose rear walls in the rearmost position of the plates register with the rear wall of the transverse slot of the gate-plate, means for guiding said plates, a selector-lever mounted to move in the slots of said gate-plate and extending through the apertures of said plates, projections in the apertures of said plates corresponding respectively in position with the longitudinal slots of said gate-plate, means for connecting said plates with the operating members of the change-speed-gear, elastic means for drawing said selector-lever toward said rear wall of the transverse slot of the gate-plate, a pedal connected to said selector-lever, an independently-pivoted cam-lever, a pedal connected to said cam-lever, and means on said selector-lever for engaging said cam-lever.

9. The combination, with the operating members of a change-speed-gear, of a gate-plate having one transverse slot and a plurality of longitudinal slots connected with said transverse slot, a plurality of superposed sliding plates movable parallel to said gate-plate and having apertures whose rear walls in the rearmost position of the plates register with the rear wall of the transverse slot of said gate-plate, means for guiding said sliding plates, a lever pivotally mounted to move in the slots of said gate-plate and extending permanently through the apertures of said sliding plates, projections in the apertures of said sliding plates corresponding respectively in position with the longitudinal slots of said gate-plate, means for connecting said sliding plates with the operating members of the change-speed-gear respectively, and means for returning said lever to the transverse slot of said gate-plate.

10. The combination, with the operating members of a change-speed-gear, of a gate-plate having one transverse slot and a plurality of longitudinal slots connected with said transverse slot, a plurality of superposed sliding plates movable parallel to said gate-plate and having apertures whose rear walls in the rearmost position of the plates register with the rear wall of the transverse slot of said gate-plate, means for guiding said sliding plates, a lever pivotally mounted to move in the slots of said gate-plate and extending permanently through the apertures of said sliding plates, projections in the apertures of said sliding plates corresponding respectively in position with the longitudinal slots of said gate-plate, means for connecting said sliding plates with the operating members of the change-speed-gear respectively, a pedal connected to said lever, projections on said pedal for engaging the sides of the foot, and means for returning said lever to the transverse slot of said gate plate.

11. The combination, with the operating members of a change-speed-gear, of a gate-plate having a transverse slot and a plurality of longitudinal slots connected with said transverse slot, a selector-lever mounted to move in the slots of said gate-plate, means for returning said selector-lever to the transverse slot of the gate-plate, a pedal connected to said selector-lever, means for detachably securing said pedal in the position in which the selector-lever is in one of the longitudinal slots of the gate-plate, a plurality of superposed plates movable parallel to said gate-plate and having apertures through which said selector-lever extends, projections in the apertures of said plates corresponding respectively in position with the longitudinal slots of said gate-plate, means for guiding said plates and means for connecting said plates with the operating members of the change-speed-gear respectively.

ARTHUR HENRY ADAMS.
MARCUS CHARLES INMAN HUNTER.

Witnesses:
H. D. JAMESON,
ALFRED NUTTING.